(12) United States Patent
Tebbe et al.

(10) Patent No.: US 6,331,355 B1
(45) Date of Patent: Dec. 18, 2001

(54) ROLLABLE, SINGLE-COATED HOT MELT ADHESIVE FILM WITH NO INTERLAYER

(75) Inventors: Heiko Tebbe, Schwetzingen; Ralf Schledjewski, Hodenhagen; Dirk Schultze, Fallingbostel, all of (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/445,718

(22) PCT Filed: Jun. 4, 1998

(86) PCT No.: PCT/EP98/03344

§ 371 Date: Dec. 9, 1999

§ 102(e) Date: Dec. 9, 1999

(87) PCT Pub. No.: WO98/58036

PCT Pub. Date: Dec. 23, 1998

(30) Foreign Application Priority Data

Jun. 17, 1997 (DE) .............................................. 197 255 38

(51) Int. Cl.[7] .......................... B32B 27/18; B32B 27/34; B32B 27/36; C09J 177/00; C09J 177/06; C09J 177/12; C09J 7/00

(52) U.S. Cl. ...................... 428/409; 428/474.4; 428/480; 524/230; 524/492; 524/493

(58) Field of Search ..................... 428/409, 480, 428/474.4; 427/535; 524/230, 492, 493

(56) References Cited

U.S. PATENT DOCUMENTS

| 3,880,691 | | 4/1975 | Pannenbecker et al. | 156/244 |
| 4,041,206 | * | 8/1977 | Tsunashima et al. | 428/409 |
| 4,366,662 | * | 1/1983 | Katsura et al. | 53/478 |
| 4,379,117 | | 4/1983 | Baird, Jr. et al. | 264/514 |
| 4,629,657 | | 12/1986 | Gulati et al. | 428/461 |
| 4,826,899 | * | 5/1989 | Rees | 524/94 |
| 4,876,139 | | 10/1989 | Yamamoto et al. | 428/200 |
| 5,126,197 | | 6/1992 | Schinkel et al. | 428/349 |
| 5,258,422 | * | 11/1993 | Chang et al. | 523/124 |

FOREIGN PATENT DOCUMENTS

| 39 11 613 | | 8/1990 | (DE) . |
| 737730-A | * | 10/1996 | (EP) . |
| WO-9408788-A | * | 4/1994 | (WO) . |

* cited by examiner

*Primary Examiner*—Harold Pyon
*Assistant Examiner*—Elena Tsoy
(74) *Attorney, Agent, or Firm*—Joseph C. Gil; Aron Preis; James R. Franks

(57) ABSTRACT

The invention provides a monolayered thermoplastic hot-melt adhesive film without a separating layer which can be rolled up and unrolled without the additional use of a separating layer and in which the polymer matrix of copolyamides and/or copolyesters contains an additive combination of 0.4 wt. % to 8.0 wt. % of a spacer and 0.05 wt. % to 1.0 wt. % of a separating and lubricating agent, and optionally up to 1 wt. % of other additives, each with respect to the total mixture.

10 Claims, No Drawings

ROLLABLE, SINGLE-COATED HOT MELT ADHESIVE FILM WITH NO INTERLAYER

This invention provides a monolayered thermoplastic hot-melt adhesive film made from thermoplastic copolyamides and/or copolyesters which is modified by the addition of additives in such a way that it can be prepared without an additional separating layer, does not block on the reel and nevertheless retains its ability to hot- bond, as a property which is required for its application according to the invention, such as two-dimensional fixing or bonding of other substrates.

Plastics films are known in many variants and for many applications. One particular embodiment is hot-melt adhesives or hot-melt films, which are understood to be films made from thermoplastic plastics which are suitable, in the molten state, for bonding other substrates due to the surface tackiness and flow properties which are then present and to their thickness. The properties and advantages of hot-melt adhesive films and methods for their preparation from current hot-melt adhesive granules or powders are described, for example, in U.S. Pat. No. 4,379,117 or DE 2 114 065. The use of hot-melt adhesive films is explained by way of example in DE 3 911 613. A general categorisation of adhesives can be found, for example, in G. Habenicht; Kleben: Grundlagen, Technologie, Anwendungen, Springer Verlag, Berlin, 1986.

The low softening or melting points of these hot-melt adhesive films or hot-melt films means that the films block on the reel. Furthermore, these materials have the disadvantage that they have very smooth surfaces which thus contribute to the blocking characteristics of the films. This impairs the running properties of machines handling them. Therefore the films have to be guided permanently by moveable parts or strips of separating material in order to prevent bonding to stationary parts and thus interrupting the process.

The prior art for processing these blocking materials to give monolayered strips is the use of separating layers such as, for example, are mentioned in DE 2 114 065. Separating layers consist, for example, of fabrics, films or siliconised papers.

The disadvantage of separating layers is that they themselves have to be produced, which leads to an increase in the cost of the hot-melt adhesive films produced. In addition, they are mostly undesirable because the separating layers have to be rolled up separately and often have to be disposed of as waste. Since these separating layers can never be fully recycled, they represent both a financial and ecological burden.

An alternative to the use of separating layers is to provide tacky or blocking materials with lubricating or antiblocking agents such as, for example, described by Botz in Taschenbuch der Kunststoff-Additive, Gachter, Muiller (eds.), 2nd. edition, Hanser Verlag, Munich, 1983, p. 229–274, of the type which are known to prevent blocking on the reel and produce a lubricating effect on machines. The adhesive properties of the films are modified by the use of such materials. The disadvantage of systems disclosed hitherto is that they modify the adhesiveness or sealability of the material or strength of the seal produced, due to coating the surface, in such a manner that they do not achieve the initial level of materials which have not been treated as a result of having to adjust the process parameters such as pressure, temperature and time.

A generally widespread procedure is also the integration of tacky and blocking materials into multi-layered structures in which the various layers only bond in the warm and do not block against each other in the cold. Thus, U.S. Pat. No. 4 629 657, EP 0 424 761 or EP 0 263 882 describe polyolefin films which are coated with hot-sealable materials. In this case, the less tacky layer takes on the function of a separating layer. These films have the disadvantages that they have only one hot-sealable face, also the bond adhesion which can be achieved is low and the end product has a not inconsiderable tendency to roll.

Therefore there is the object of providing a monolayered film with high adhesive power for heat laminating, sealing and fixing which can be rolled up and unrolled without adhering to itself and can be passed through current processing machines with a low likelihood of blocking.

According to the invention, it is possible to provide a monolayered hot-melt adhesive film made from copolyesters and/or copolyamides which has no separating layer and which adequately satisfies the requirements mentioned, which is characterised in that it can be rolled up and unrolled without adhering and without the additional use of a separating layer and the polymer matrix of copolyamide and/or copolyester contains an additive combination of 0.4 wt. % to 8.0 wt. % of a spacer and 0.05 wt. % to 1.0 wt. % of a separating and lubricating agent, and optionally up to 1 wt. % of other additives, each with respect to the total mixture.

In a preferred embodiment, an additive combination is used which is characterised in that it contains 0.4 wt. % to 8.0 wt. % of a silica and 0.05 wt. % to 1.0 wt. % of a long-chain and/or cyclic fatty acid amide.

In a particularly preferred embodiment, an additive combination is used which is characterised in that it contains, in addition to the specified long-chain and/or cyclic fatty acid amide, 0.02 wt. % to 0.4 wt. % of a soap as a separating and lubricating agent.

In a preferred embodiment, the additives are incorporated into the polymer matrix of copolyesters and/or copolyamides by means of a masterbatch, characterised in that the additive batch is built up from 35 wt. % to 80 wt. % of copolyester and/or copolyamide, 20 wt. % to 50 wt. % of silica, 2 wt. % to 10 wt. % of a long-chain and/or cyclic fatty acid amide and 0.5 wt. % to 5 wt. % of soap.

Suitable starting materials for the polymer matrix are the corresponding thermoplastic hot-melt adhesives which are currently available on the market from known suppliers and are available, for example, under the commercial names Dynapol®, Vestamelt®, Platamid®, Bostik and Griltex®. The adhesive raw materials used according to the invention are preferably thermoplastic copolyamides and/or copolyesters.

The viscosity of polymer matrix materials is generally characterised by the melt flow index (NMFI) and the melt viscosity. The melt flow indices of the polymer matrix components are preferably between 1.5 g/10 min and 150 g/10 min, measured according to DIN 5 37 35 at 160° C. and with a test weight of 2.16 kg. The melt viscosities of the polymer matrix materials are preferably between 400 Pa.s and 1000 Pa.s, measured according to ISO 1133 at a temperature of 160° C.

Furthermore, hot-melt adhesive raw materials which have a thermoanalytically determined maximum main melting point of between 80° C. and 130° C. are preferred.

Suitable spacers are natural silicas, synthetic silicas and polymeric spacers. Natural silicas are preferably used. Fats, waxes and soaps are suitable as separating and lubricating agents. Long-chain and/or cyclic fatty acid amides which contain aliphatic groups with a carbon chain length of preferably 14 to 20 carbon atoms are preferably used. Suitable third additive components are soaps with a chain length of 12 to 20 carbon atoms. In a preferred form, these soaps are preferably present as the calcium salt.

Due to the use of the additive combination according to the invention, it is possible to prepare hot-melt adhesive films which not only have good machine-running properties, but also do not require the otherwise conventional separating layers which, as is known, increase the manufacturing costs of the films to a not inconsiderable extent. To a person skilled in the art, who has received the relevant training and experience, it would not be obvious that the antiblocking/separating agent combination according to the invention would not have a long-lasting negative effect on the adhesive properties of the mixture/film formulations according to the invention.

Normal thermal forming processes for processing plastics are suitable for preparing hot-melt adhesive films according to the invention. In particular, melt extrusion is suitable for incorporating and mixing the additives into the polymer matrix. Incorporation of the additives may take place as a compounding procedure using all the components or, in a preferred form, by adding a masterbatch during the manufacturing process.

Films according to the invention can be prepared by the flat film process or the blown film process. In a preferred embodiment, the films are prepared by the blown film process. The blown film process enables flexible adjustment of the width produced to the requirements of the market due to the use of different blow-up ratios.

The breakdown of the thermoplastic hot-melt adhesives which is required for the blown film process can be performed with the aid of suitable screw moulding tools such as are described, for example, by Wortberg, Mahlke and Effen in: Kunststoffe, 84 (1994) 1131–1138. Moulding tools for extruding the melts into films are described, inter alia, by Michaele in : Extrusions-Werkzeuge, Hanser Verlag, Munich 1991.

In a preferred embodiment, films according to the invention have a total layer thickness between 15 µm and 200 µm.

The surface properties of films according to the invention can be adapted to the substrates to be bonded with the aid of familiar surface treatment processes, preferably corona, flame and/or fluorine treatment. Various processes for surface modification are described, for example, by Gerstenberg in: Coating 4/93, p. 119–122.

The invention also provides a process for preparing composites from any substrates and a film according to the invention, characterised in that the film is assembled with at least one substrate under the effects of heat and preferably only slight pressure. In a preferred embodiment, the film is laid between two different substrates and bonds these after being assembled as a unit under the effects of pressure and heat.

The substrates are preferably continuous strips of material or sections thereof. These types of continuous strip materials are, for example, woven materials, non-wovens, films, papers, cardboards and cardboard packaging. They also consist of cellulose or cellulose-containing products, other plant products, fibrous materials, plastics or even metals.

The invention also provides sections or cutouts of films, generally obtained by stamping out or cutting and their use for fixing and/or sealing materials or objects to each other, characterised in that sections or cutouts of films according to the invention are placed between two identical or different materials or objects and bonding in the form of sealing or fixing takes place under the effects of heat and optionally pressure. Suitable substances of this type for bonding are preferably cellulose or cellulose-containing products, woods, plant and animal fibrous materials, plastics, metals and glasses.

Composites and/or connections according to the invention are thermoreversible. They can therefore be taken apart again after use so that the materials used are then available for materials recycling.

EXAMPLES

Example A

A film was prepared by the blown film process, this being produced from a thermoplastic copolyester, which had been built up from the components butanediol, terephthalic acid and isophthalic acid, with a MFI of 18 g/10 min, measured according to DIN 53 735 at 160° C. with a test weight of 2.16 kg. The thermoanalytically determined melting point of the copolyester was 125–130° C. 10 wt. % of an antiblocking batch was added to this polymer matrix, the batch consisting of 53 wt. % of copolyester which had been built up from the components butanediol, terephthalic acid and isophthalic acid, 40 wt. % of silica, 5 wt. % of long- chain fatty acid amide and 2 wt. % of calcium stearate. All the components were mutually plasticised in an extruder using a three-zone screw. A tubular film was formed from the melt with the aid of a blown film moulding tool. The ring-shaped product was cooled by blowing air through, then it was laid flat and cut in the edge region so that two strips of film could be separated. These were rolled onto separate winding devices. The film obtained had a thickness of 50 µm.

Comparison example B

The thermoplastic copolyester described in example A was plasticised, using an extruder, without the addition of further processing aids. A tubular film was produced from the melt with the aid of a blown film moulding tool. This tubular film could not then be laid flat since it would not pass smoothly through the machinery due to the high degree of tackiness.

Comparison Example C

Using a two-layer blown film moulding tool, a film was prepared in which the first layer was formed from a thermoplastic copolyester as described in example B. The material used was melted using an extruder.

The second layer was formed from a LD polyethylene with a density of 0.9 g/cm$^3$ and a MFI of 2 g/10 min, measured according to DIN 53 735 at 160° C. with a test weight of 2.16 kg. This material was plasticised in a second extruder.

The two melt streams were laid one on top of the other in a two-layer blown film head and discharged from this. The ring-shaped product was cooled by blowing air through, then laid out flat and cut in the edge regions so that two film strips could be separated. These were rolled onto separate winding devices. The thickness of each individual layer was 50 μm. The comparison properties were tested using the copolyester-based layer; the polyethylene based layer was peeled off beforehand.

The following properties were tested using samples prepared from the example and comparison examples:

laboratory press. One projecting layer of textile is then clamped in a holder which is connected to a spring balance. The other projecting layer of textile is then pulled until the bonded section of laminate rips apart. The force required for this corresponds to the peel force and is read off from the spring balance. Depending on the duration of the bonding process, the highest peel force was used for comparison purposes.

The data characterising the properties according to the invention of the films which are given in the following table show clearly that preparation of the film according to the invention described in the example is an advantage as compared to that of films prepared in the scope of the comparison examples and at the same time they have comparable adhesive properties.

TABLE 1

Properties of the films prepared in the scope of the example and comparison examples

| Property | Method of determination | Units | Example A | Comparison example B | Comparison example C |
|---|---|---|---|---|---|
| Prepared with separating layer | ./. | ./. | no | no | yes |
| Can be unrolled | ./. | ./. | yes | no | yes |
| Softening range | Kofler bank/ in-house method | ° C. | 104–105 | ./. | 103–106 |
| Peel force | in-house method | N | 49 | ./. | 50* |

*after separation from the PE separating layer.

Unrolling Behaviour

The unrolling behaviour was determined using a roll of film clamped in an unrolling device by manually unrolling.

Softening Range

The values cited for the softening range on a Kofler heating bank are based on the in-house method described below. (Film) pieces of the plastics to be tested, with an area of at least 1 mm$^2$, are laid on a Kofler heating bank. When these pieces have lain on the Kofler heating bank for at least 60 s, a scalpel is used to determine at which position on the heating bank the plastics test pieces can be plastically deformed from the side without exerting a large force. The position on the Kofler heating bank is then correlated with a temperature. The maximum and minimum values determined for different test pieces give the upper and lower ends of the softening range.

Peel Force

To determine the peel force, samples with a width of 4 cm and a length of at least 5 cm were cut out of the films in the examples. These samples were laid between two textiles made from cotton in such a way that a 5 cm long border of textile projected on one side. Then the textiles and film were bonded together at a pressure of 220 g/cm$^2$ and a temperature of 170° C. for a duration of 20 s to 200 s, using a

What is claimed is:

1. A monolayered thermoplastic hot-melt adhesive film comprising:
    (a) a polymer matrix consisting essentially of at least one of copolyamides and copolyesters; and
    (b) an additive combination of,
        (i) 0.4 wt. % to 8.0 wt. % of a spacer,
        (ii) 0.05 wt. % to 1.0 wt. % of a separating and lubricating agent, and
        (iii) optionally up to 1 wt. % of a soap, each wt. % being with respect to the total mixture,
wherein said adhesive film is free of a separating layer, and said adhesive film can be rolled up and unrolled without the additional use of said separating layer.

2. The film of claim 1 wherein said spacer (b)(i) is silica, and said separating and lubricating agent (b)(ii) is a long-chain and/or cyclic fatty acid amide.

3. The film of claim 1 wherein said soap (iii) is present in an amount of 0.02 to 0.4 wt. percent.

4. A method for making the film of claim 3 comprising introducing an additive combination into said matrix by means of a master batch containing: 35 to 80 percent of at least one member selected from the group consisting of copolyester and copolyamide; 20 to 50 percent of silica; 2 to 10 percent of a long chain and/or cyclic fatty acid amide; and 0.5 to 5 percent of soap, said percents being relative to the weight of said master batch.

5. The film of claim 1 prepared by the flat film process.

6. The film of claim 1 prepared by the blown film process.

7. The film of claim 5 wherein the process further comprises subjecting at least one surface of said film to a treatment selected from the group consisting of corona treatment, flame treatment and fluorine treatment.

8. The film of claim 6 wherein the process further comprises subjecting at least one surface of said film to a treatment selected from the group consisting of corona treatment, flame treatment and fluorine treatment.

9. The film of claim 3 wherein said soap (b)(iii) has a chain length of 12 to 20 carbons.

10. The film of claim 9 wherein said soap (b)(iii) is a calcium salt.

* * * * *